United States Patent
Tanida et al.

(10) Patent No.: US 10,486,348 B2
(45) Date of Patent: Nov. 26, 2019

(54) DECORATIVE RESIN MOLDED ARTICLE AND ITS PRODUCTION METHOD

(71) Applicant: SEIREN CO., LTD., Fukui-shi, Fukui (JP)

(72) Inventors: Ikuhiro Tanida, Fukui (JP); Takaaki Ueki, Fukui (JP)

(73) Assignee: Seiren Co., Ltd., Fukui (JP)

( * ) Notice: Subject to any disclaimer, the term of this patent is extended or adjusted under 35 U.S.C. 154(b) by 754 days.

(21) Appl. No.: 14/816,647

(22) Filed: Aug. 3, 2015

(65) Prior Publication Data

US 2015/0336312 A1  Nov. 26, 2015

Related U.S. Application Data

(62) Division of application No. 13/358,089, filed on Jan. 25, 2012, now abandoned.

(30) Foreign Application Priority Data

Jan. 28, 2011 (JP) .................................. 2011-016593

(51) Int. Cl.
| | | |
|---|---|---|
| *B29L 31/00* | (2006.01) | |
| *B29C 45/14* | (2006.01) | |
| *B29C 45/16* | (2006.01) | |
| *B29C 37/00* | (2006.01) | |

(52) U.S. Cl.
CPC .... *B29C 45/1671* (2013.01); *B29C 45/14688* (2013.01); *B29C 45/14811* (2013.01); *B29C 2037/0042* (2013.01); *B29C 2045/14704* (2013.01); *B29C 2045/14729* (2013.01); *B29K 2995/002* (2013.01); *B29L 2031/722* (2013.01); *Y10T 428/24802* (2015.01)

(58) Field of Classification Search
CPC ...................... B29C 45/14688; B29L 2031/722
See application file for complete search history.

(56) References Cited

U.S. PATENT DOCUMENTS

| | | | |
|---|---|---|---|
| 2009/0047477 A1* | 2/2009 | Roys | B29C 51/14 428/156 |
| 2009/0174121 A1* | 7/2009 | Hayes | B29C 45/1671 264/447 |
| 2010/0196668 A1 | 8/2010 | Atake et al. | |
| 2010/0239830 A1* | 9/2010 | Ohnishi | C09D 11/101 428/195.1 |

(Continued)

FOREIGN PATENT DOCUMENTS

| | | |
|---|---|---|
| JP | 6-072013 | 3/1994 |
| JP | 6-115238 | 4/1994 |
| JP | 6-118628 | 4/1994 |

(Continued)

*Primary Examiner* — Jeffrey M Wollschlager
*Assistant Examiner* — Armand Melendez
(74) *Attorney, Agent, or Firm* — Norris McLaughlin, P.A.

(57) ABSTRACT

A decorative resin molded article includes a resin sheet having, as formed on one side thereof, convex projections made of an ink containing a UV-curable resin and a colorant, and therefore having, on that one side thereof, a design of a color pattern and a concave and convex pattern synchronizing with each other, and a resin injection-molded body as laminated and integrated on the other side of the resin sheet through injection molding of a synthetic resin thereon.

6 Claims, 5 Drawing Sheets

(56) References Cited

U.S. PATENT DOCUMENTS

2011/0177303 A1* 7/2011 Suehiro .................... B44C 3/02
428/195.1

FOREIGN PATENT DOCUMENTS

| | | | | |
|---|---|---|---|---|
| JP | 7-032548 | 2/1995 | | |
| JP | 7-137426 | 5/1995 | | |
| JP | 2002-240078 | 8/2002 | | |
| JP | 2003-145573 | 5/2003 | | |
| JP | 2004-042409 | 2/2004 | | |
| JP | 2004-276416 | 10/2004 | | |
| JP | 2008-105415 | 5/2008 | | |
| JP | 2008-272946 | 11/2008 | | |
| JP | 2009-067860 | 4/2009 | | |
| JP | 2009-096866 | 5/2009 | | |
| JP | WO 2010013667 A1 * | 2/2010 | ............... | B44C 3/02 |
| WO | WO 2010123733 A1 * | 10/2010 | ............ | H01Q 1/243 |

* cited by examiner

DECORATIVE RESIN MOLDED ARTICLE AND ITS PRODUCTION METHOD

REFERENCE TO RELATED APPLICATION

This is a divisional application of Ser. No. 13/358,089, filed Jan. 25, 2012 which is currently pending. The subject matter of the aforementioned prior application is hereby incorporated herein by reference.

This application is based upon and claims the benefit of priority from the prior Japanese Patent Application No. 2011-16593, filed on Jan. 28, 2011; the entire contents of which are incorporated herein by reference.

BACKGROUND

1. Technical Field

The disclosure relates to a decorative resin molded article given an appearance with a concave and convex impression on the surface thereof, and to a method for producing the article.

2. Related Art

Heretofore, for imparting an appearance with a concave and convex impression to the surface of a synthetic resin molded article, there is known a method of previously forming concaves and convexes on the cavity surface of an injection mold and giving the concave and convex pattern to the surface of the injection molded article. In this method, the concave and convex pattern could be given to the planar section of the molded article, however, the concave and convex pattern is difficult to impart to the side section including curved surface shape parts thereof. This is because, when the molded article is drawn out from the mold and when the molded article has concaves and convexes on the side thereof, then the article is difficult to draw out from the mold, therefore bringing about a problem in operation.

On the other hand, as one method of decorating the surface of a synthetic resin molded article, there is known a method of arranging a previously-decorated resin sheet inside a mold followed by injecting a synthetic resin into the mold to thereby integrate the decorated resin sheet and the synthetic resin injection-molded body (sheet-insert molding method).

For example, JP-A 2003-145573 discloses an insert-molded article, for which a sheet decorated with a UV-curable color ink is used and set in a mold with the color ink layer thereof serving as a decorative layer kept facing inside and a resin injection-molded body is laminated and integrated on the decorative layer. JP-A 2008-272946 discloses a decorating method that includes providing a decorative layer on the back of a resin sheet through ink jet printing with a UV-curable ink, then providing a binder layer thereon, and laminating and integrating a resin injection-molded body on the side of the binder layer. In that manner, heretofore, in case where a decorated resin sheet is insert-molded, generally, the resin sheet is arranged in a mold with the decorative layer thereof kept facing the side of the resin to be injected therein, and in that condition, the resin is injection-molded so that the decorative layer is provided on the inner face of the resin sheet.

Accordingly, in the decorative resin molded article produced according to the above-mentioned sheet-insert molding method, the design with the decorative layer is expressed outside via the resin sheet, and is therefore influenced by the transmittance and the like of the resin sheet.

JP-A 07-032548 discloses a technique of laminating a UV-curable resin layer having a concave and convex pattern on one side of a transparent resin sheet followed by laminating and integrating the resulting laminate sheet with a resin injection-molded body. The laminate sheet has a sheet-like UV-curable resin layer having, on one side thereof, a concave, and convex pattern made with an engraved roll, in which, however, the color pattern and the concave and convex pattern are not synchronized. In addition, the concave and convex pattern face of the laminate sheet is made to face the side of the resin to be injected, and in that condition, the resin injection-molded body is laminated and integrated with the sheet.

JP-A 2008-105415 discloses a technique of preparing a decorative sheet by sequentially laminating a decorative layer of a print layer and an adhesive layer on an acrylic resin film, then providing a concave and convex pattern on the acrylic resin film by embossing on the surface opposite to the decorative layer thereof, and laminating and integrating a resin injection-molded body on the adhesive layer of the acrylic resin film. In this reference, the concave and convex pattern is formed on the surface side of the obtained, decorative resin molded article; however, the concave and convex pattern is formed by embossing and is not synchronized with a color pattern. And in addition, in this reference, the resin injection-molded body is laminated and integrated on the side of the print layer serving as a decorative layer. JP-A 2004-276416 also discloses a technique of forming a fine concave and convex layer on the surface of a decorative resin molded article; however, also in this reference, the pattern layer serving as a decorative layer is not synchronized with the concave and convex pattern on the surface of the article, and in addition, the resin injection-molded body is laminated and integrated with the decorative layer.

JP-A 2004-042409 discloses a technique of providing a surface protective layer formed of a UV-curable resin on one side of a resin sheet, forming a fine concave and convex pattern on the surface protective layer by pressurization under heat, then UV-curing the surface protective layer and providing a decorative layer having a pattern synchronizing with the concave and convex pattern on the other side of the resin sheet, and laminating and integrating a resin injection-molded body on the decorative layer. However, in this reference, the region having the fine concave and convex pattern and the decorative layer are synchronized so as not to overlap with each other between one side and the other side of the resin sheet. Accordingly, this differs from a technique, of providing colored convex projections on one side of a resin sheet to thereby provide, on that one side thereof, a design of a color pattern and a concave and convex pattern synchronizing with each other. In addition, in this reference, the resin injection-molded body is laminated and integrated on the decorative layer side, liken in the above-mentioned JP-A 2008-105415 and JP-A 2004-276416.

SUMMARY

A decorative resin molded article of an embodiment includes a resin sheet having, as formed on one side thereof, one or more convex projections made of an ink containing a UV-curable resin and a colorant, and therefore having, on that one side thereof, a design of a color pattern and a concave and convex pattern synchronizing with each other, and a resin injection-molded body as laminated and integrated on the other side of the resin sheet through injection molding of a synthetic resin thereon.

A method for producing a decorative resin molded article of an embodiment includes forming one or more convex projections made of an ink containing a UV-curable resin and a colorant on one side of a resin sheet to thereby provide thereon a design of a color pattern and a concave and convex pattern synchronizing with each other, then arranging the design-formed resin sheet inside an injection mold, and injecting a synthetic resin onto the other side of the resin sheet in the injection mold, thereby laminating and integrating a resin injection-molded body on that other side of the resin sheet.

DETAILED DESCRIPTION

Figure 1:
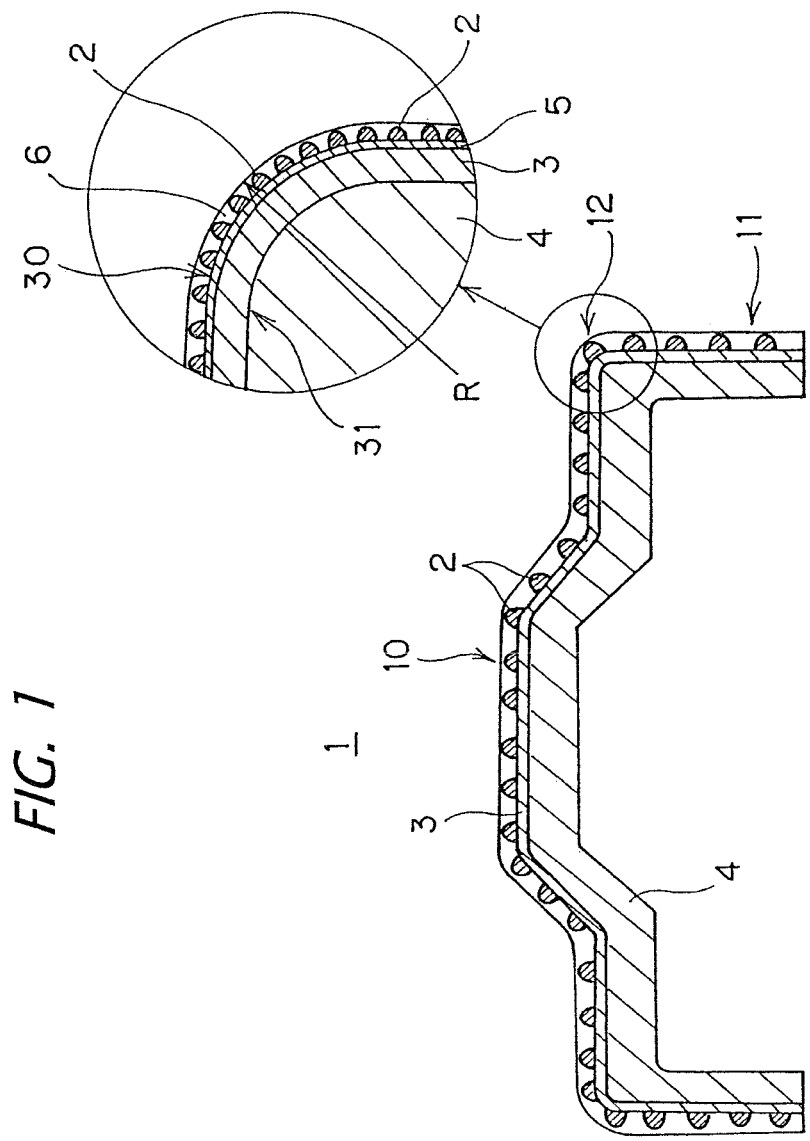
FIG. 1 is a cross-sectional view of a decorative resin molded article of an embodiment.

In the following detailed description, for purposes of explanation, numerous specific details are set forth in order to provide, a thorough understanding of the disclosed embodiments. It will be apparent, however, that one or more embodiments may be practiced without these specific details. In other instances, well-known structures and devices are schematically shown in order to simplify the drawing.

An object of an embodiment is to provide a decorative resin molded article, which has a design of a color pattern and a concave and convex pattern synchronizing with each other imparted even to the curved surface shape portion of the resin molded article, and which has an excellent appearance with a concave and convex impression given thereto.

Figure 2:
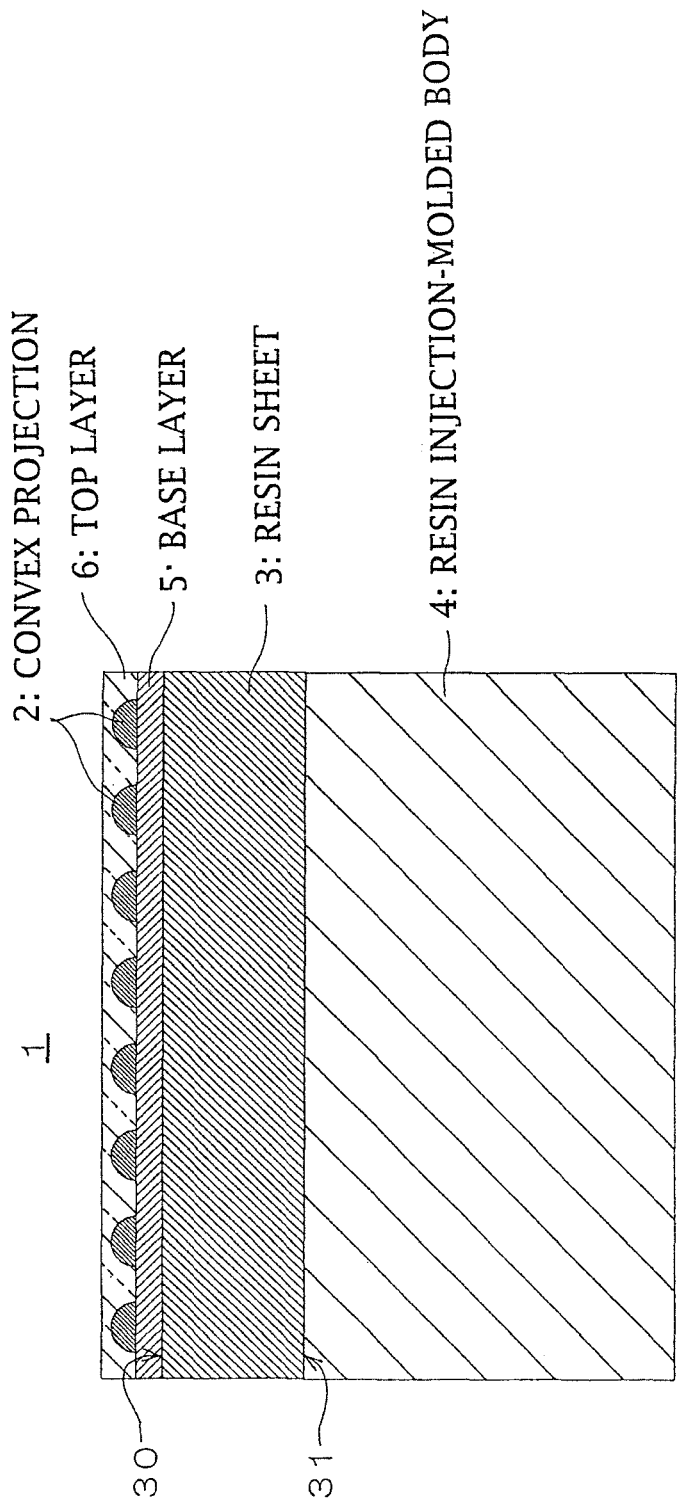
FIG. 2 is a schematic cross-sectional view of the decorative resin molded article.

As shown in FIGS. 1 and 2, the decorative resin molded article (1) of an embodiment includes a resin sheet (3) that has, as formed on one side (30) thereof, convex projections (2) of an ink containing a UV-curable resin and a colorant, and therefore has, on that one side, a design of a color pattern and a concave and convex pattern synchronizing with each other, and a resin injection-molded body (4) as laminated and integrated on the other side (31) of the resin sheet (3) through injection molding of a synthetic resin thereon. In this embodiment, in addition, a base layer (5) is provided between the resin sheet (3) and the convex projections (2), and a top layer (8) is provided on the convex projections (2).

As the resin sheet (3) usable is a single-layer film or a multi-layer film of various thermoplastic resins such as polycarbonate resin, polyethylene terephthalate resin, acrylic resin, olefin resin, acrylonitrile-butadiene-styrene (ABS) resin, etc. Not specifically defined, the thickness of the resin sheet (3) is preferably from 0.2 to 1.0 mm or so, more preferably from 0.3 to 0.7 mm.

On one side (30) of the resin sheet (3), formed are convex projections (2) made of an ink containing a UV-curable resin and a colorant. Thus formed, the colored convex projections (2) provide a color pattern since the part having the convex projections (2) and the part not having them differ in color, and typically, a concave and convex pattern is formed in which the convex projections (2) form convexes and the part not having the convex projections (2) forms concaves, and in addition, the color pattern synchronizes with the concave and convex pattern (synchronizing may also be referred to as "coincidence" or "coordination"), or that is, the thus-patterned design is formed on one side (30) of the sheet. In this embodiment, the base layer (5) colored differently from the convex projections (2) is provided on one side (30) of the resin sheet (3), and the convex projections (2) are formed on the base layer (5); and therefore, the concave and convex pattern, in which the surface of the base layer (5) not having the convex projections (2) thereon forms concaves and the convex projections (2) form convexes, is provided as synchronized with the color pattern.

In general, multiple convex projections (2) are formed on one side (30) of the resin sheet (3) to form the concave and convex pattern; however, streaky convex projections (2) may be linked to each other and the resulting one convex projection (2) may form the concave and convex pattern as a whole. Specifically, regarding the plane configuration thereof, the convex projections (2) may have any form, of a circular or oval or even long oval form, or a square or triangle form or any other polygonal form, or a straight linear or waved form or any other linear form, with no specific limitation thereon. For enhancing the design effect thereof, preferably, the convex projections (2) are arranged so as to be distributed entirely on one side (30) of the resin sheet (3), The convex projections (2) are so provided as to form the concave and convex pattern that can be visually sensed, and therefore preferably, the plane-view width of the convex projection (2) (in case where it has a nearly circular form, the diameter thereof) is at least 0.2 mm, more preferably at least 0.4 mm. On the contrary, however, if they are too large, the concave and convex pattern may be rough to worsen the design performance thereof; and therefore, from the viewpoint of design expression precise and excellent in the concave and convex impression thereof, the plane-view width of the convex projections (2) is preferably at most 10 mm, more preferably at most 4 mm, even more preferably at most 2 mm. However, so far as the pattern is not required to be precise, the width could be more than the above, for example, 20 mm or so.

Not specifically defined, the height of the convex projections (2) is preferably from 20 to 200 μm for imparting an excellent concave and convex impression to the decorative resin molded article (1), more preferably from 40 to 150 μm, even more preferably from 60 to 120 μm. The height of the convex projections (2) is the height from the base face on which the convex projections (2) are formed; and in this embodiment having the base layer (5), the height is from the surface of the base layer (5) to the top of the convex projection (2).

As the ink to form the convex projections (2), used here is an ink containing a UV-curable resin and a colorant. Using the ink including, as the main ingredient thereof, a UV-curable resin makes it possible to cure instantaneously the ink applied onto one side (30) of the resin sheet (3) while keeping the convex form as it is, thereby giving the convex projections (2); and in addition, the convex projections (2) can be prevented from being deformed in injection molding to form the resin injection-molded body (4) according to an insert molding process.

As the UV-curable resin, various known UV-curable resins may be used here. Above all, in consideration of the curved face followability thereof, preferred are UV-curable resins having the characteristics that they are hard to crack even when bent, they are stretchable, and they do not thin after cured. Concretely, there may be mentioned UV-curable resins having an acrylic functional group.

The UV-curable resin basically includes a reactive monomer, a reactive oligomer and a photopolymerization initiator.

The oligomer is a polymer including from 2 to tens or so molecules of monomer bonding to each other. Such an oligomer may be used here because when a monomer alone is used, the cured product to be obtained would be poor in the hardness and the adhesiveness thereof, and could not exhibit sufficient durability. The word "reactive" means that the compound has a reactive functional group in the molecule thereof. As the reactive functional group, in general, there may be mentioned an acrylic functional group, an epoxy functional group, etc. As described above, preferred for use in the embodiment are those having an acrylic functional group. Acrylic compounds are preferred from the viewpoint that they have broad utility and they can give various types of cured resins. Through UV irradiation, the photopolymerization initiator generates a radical, which activates the functional group of a reactive monomer and a reactive oligomer, therefore sequentially bonding the molecules in chains to give a polymer (acrylic resin).

The reactive monomer is used as a diluent for viscosity control. As the reactive monomer, there may be mentioned mono- to hexa-functional acrylates with no specific limitation. Above all, especially preferred are 2-functional acrylates as excellent in toughness and flexibility. Concretely, the 2-functional acrylate includes neopentyl glycol hydroxypivalate diacrylate, polytetramethylene glycol diacrylate, trimethylolpropane acrylate benzoate, diethylene glycol diacrylate, triethylene glycol diacrylate, tetraethylene glycol diacrylate, polyethylene glycol (200) diacrylate, polyethylene glycol (400) diacrylate, polyethylene glycol (600) diacrylate, polyethylene glycol (1000) diacrylate, polypropylene glycol (400) diacrylate, polypropylene glycol (700) diacrylate, 2-(2-vinyloxyethoxy)ethyl acrylate, neopentyl glycol diacrylate, 1,3-butanediol diacrylate, 1,4-butanediol diacrylate, 1,6-hexanediol diacrylate, 1,9-nonanediol diacrylate, dimethyloltricyclodecane diacrylate, bisphenol A ethyleneoxide adduct diacrylate, etc. Further usable herein are those prepared by modifying the above acrylates with phosphorus, fluorine, ethoxy group, propoxy group, ethylene oxide, propylene oxide, caprolactone or the like. These may be used here either singly or as combined into a blend of two or more of them.

Preferably, the glass transition point Tg of the reactive monomer is not lower than 20° C. in order that the surface adhesiveness of the cured product could be low. In this description, the glass transition point is a value measured using a differential scanning calorimeter (Bruker AXS's trade name, "DSC-3100") at a beating speed of 5° C./min and within a temperature range of from −150 to 300° C.

The viscosity at 25° C. of the reactive monomer is preferably at most 30 mPa·s, when to be used in ink jet printing, in consideration of the ink droplet jettability. In this description, the viscosity is a value measured using a rotary viscometer (Told Sangyo's trade name, "TVB-20LT") with an L rotor at a rotation number of 60 rpm and within a range of 2.5 M (viscosity range for measurement: up to 25.00 mPa·s).

Preferably, the content of the reactive monomer in the Ink (containing a UV-curable resin and a colorant) is from 55 to 90% by weight. The content of the reactive monomer in the ink is preferably at least 55% by weight in order to secure good jettability when to be used in ink jet printing, more preferably at least 80% by weight. For incorporating other chemicals necessary for curing, the content is preferably at most 90% by weight, more preferably at most 75% by weight.

The reactive oligomer includes, for example, methane acrylate, polyester acrylate, epoxy acrylate, silicone acrylate, polybutadiene acrylate, etc. These may be used here either singly or as combined into a blend of two or more of them. Above all, preferred is methane acrylate as excellent in adhesiveness.

Preferably, the glass transition point Tg of the reactive oligomer is from −10 to 40° C. for securing the surface followability of the cured product, more preferably from 0 to 30° C.

Preferably, the content of the reactive oligomer in the ink is from 5 to 40% by weight for enhancing the abrasion resistance, the flexibility and the adhesiveness of the convex projections to be formed, more preferably from 20 to 35% by weight, even more preferably from 20 to 25% by weight.

The photopolymerization initiator includes, for example, benzoins, benzyl ketals, aminoketones, titanocenes, bisimidazoles, hydroxyketones, acylphosphine oxides, etc. These may be used either singly or as combined into a blend of two or more of them. Above all, preferred are hydroxyketones and acylphosphine oxides as highly reactive and resistant to yellowing. For promoting the initiation reaction with the photopolymerization initiator, a sensitizer is preferably used as an additive.

The content of the photopolymerization initiator in the ink is preferably from 1 to 10% by weight in order that the polymerization could be attained sufficiently and in consideration of the curing ratio, the curing speed and the cost, more preferably from 3 to 9% by weight.

The colorant is added to the ink for forming a color pattern synchronizing with the concave and convex pattern by the convex projections (2). As the colorant, usable are pigment and dye. In case where weather resistance and lightfastness are required, preferred is use of pigment; and in case where vividness is required, preferred is use of dye.

The pigment may be any of organic or inorganic ones.

The organic pigment includes, for example, nitroso compounds, dyeing lakes, azo lakes, insoluble azo compounds, monoazo compounds, disazo compounds, condensed azo compounds, benzimidazolones, phthalocyanines, anthraquinones, perylenes, quinacridones, dioxazines, isoindolines, azomethines, pyrrolopyrroles, etc.

The inorganic pigment includes, for example, oxides, hydroxides, sulfides, ferrocyanides, chromates, carbonates, silicates, phosphates, carbons (carbon black), metal powders, etc.

The dye includes, for example, oil-soluble dyes, disperse dyes, acidic dyes, reactive dyes, cationic dyes, direct dyes and others having, as the chromophoric group or the chromogenic group therein, any of azo groups, anthraquinones, indigoids, phthalocyanines, carboniums, quinonimines, methines, xanthenes, nitro groups, nitroso groups, etc.

The content of the colorant in the ink is preferably from 0.01 to 10% by weight for sufficient coloration and in consideration of the ink jettability and the cost when to be used in inkjet printing, more preferably from 0.01 to 4% by weight.

In forming the design with the above-mentioned convex projections (2), an ink basically containing a UV-curable resin and a colorant is used; however, along with such a color ink, a colorless ink may additionally be used. For example, in full-color printing, in general, yellow, magenta, cyan and black inks are used; however, any other inks of various colors additionally including a colorless ink may also be used.

If desired, other various additives may be added to the ink, for example, a sensitizer for promoting the initiation reaction with the photopolymerization initiator, as well as a dispersant, a heat stabilizer, a thermal radical polymerization inhibitor, an antioxidant, a preservative, a pH regulator, a defoaming agent, a penetrant, etc.

The synthetic resin to form the resin injection-molded body (4) includes, for example, styrene resins such as polystyrene (PS), acrylonitrile-butadiene-styrene (ABS), etc.; olefin resins such as polyethylene (PE), polypropylene (PP), etc.; polycarbonate resins (PC), acrylic resins, etc. These may be used here either singly or as combined into a blend of two or more of them.

If desired, ordinary additives may be added to the synthetic resin, for example, an antioxidant, a light stabilizer, a plasticizer, a filler, a hydrolysis inhibitor, a UV absorbent, a heat stabilizer, a flame retardant, etc.

The base layer (5) is a resin layer preferably provided from the viewpoint of enhancing the adhesiveness of the design-constituting convex projections (2) to the resin sheet (3), and is advantageous for forming a different color layer between the convex projections (2) to thereby sharpen the color pattern. The base layer (5) is an inclusive term of a resin layer to be provided between the resin sheet (3) and the convex projections (2), and includes at least one resin layer, but may include the same or different two or more resin layers, Preferably, the base layer (5) is so provided as to cover the entire surface of one side (30) of the resin sheet (3) at a constant thickness, and the thickness thereof is preferably from 0.1 to 300 μm, more preferably from 5 to 50 μm.

The resin to constitute the base layer (5) includes, for example, a polyester resin, a polyurethane resin, an acrylic resin, a silicone resin, an epoxy resin, an alkyd resin, an aminoalkyd resin, etc. Especially preferred, are an acrylic resin and a polyurethane resin from the viewpoint of the adhesiveness thereof.

Preferably, the base layer (5) is colored differently from the above-mentioned convex projections (2) for forming a desired color pattern. As the colorant to be added for coloration, preferred is use of pigment from the viewpoint of the weather resistance and the lightfastness thereof. The pigment may be any of organic or inorganic pigments.

For the coating material to be used for forming the base layer (5), the above-mentioned resin may be diluted with an organic solvent of any type, for the purpose of making the coating material have a dynamic viscosity suitable for the coating device to be used. If desired, additives may be added thereto, for example, a crosslinking agent, a thickener, a precipitation inhibitor, a defoaming agent, an antistatic agent, an antioxidant, a curing catalyst, an antiglare agent, a leveling agent, a smoothing agent, a UV absorbent, etc.

The top layer (6) is an optional transparent layer provided so as to cover the convex projections (2) and the base layer (5), thereby covering entirely one side (30) of the resin sheet (3), as shown in FIG. 2. The top layer (8) is an inclusive term of a transparent resin layer to be formed on the convex projections (2), and includes at least one resin layer but may include the same or different two or more resin layers, in this embodiment, the top layer (8) is so formed that its surface is a planar face running along (i.e., following) one side (30) of the resin sheet (3). Providing such a flat top layer (8) makes it possible to visually sense the concave and convex pattern via the top layer (6) and to enhance the design value. Not specifically defined, the thickness of the top layer (6) is preferably from 100 to 1000 μm as the thickness from the top of the convex projection (2) to the surface of the top layer (6).

The top layer (6) is formed of a transparent resin, and is preferably colorless and transparent; however, the layer may also be colored and transparent so far as it does not detract from the concave and convex impression with the convex projections (2). The resin to constitute the top layer (6) includes, for example, a polyester resin, a polyurethane resin, an acrylic resin, a silicone resin, an epoxy resin, an alkyd resin, an aminoalkyd resin, etc. These may be used here either singly or as combined into a blend of two or more of them. Above all, preferred are a polyester resin, a polyurethane resin and an acrylic resin as excellent in fretting resistance and transparency and capable of forming a thick coating film. More preferred are a polyester resin and an acrylic resin.

As the colorant for coloring the top layer (6), preferred is use of pigment from the viewpoint of weather resistance and lightfastness, and the pigment to be used here may be any of organic or inorganic ones.

The coating material to be used for forming the top layer (6) may be prepared by diluting the above-mentioned resin with an organic solvent of any type, and if desired, various additives may be added thereto.

The decorative resin molded article (1) of this embodiment includes a top portion (10), a side portion (11) provided around the periphery of the top portion, and a curved portion (12) to be a corner arranged between the top portion (10) and the side portion (11), and has the decorative layer composed of the above-mentioned, convex projections (2), base layer (5) and top layer (6) as formed to face outwardly, as shown in FIG. 1. The curved portion (12) is a curved surface shape portion having an outwardly-convexed arced form of which the radius of curvature (R) of the cross section is from 1 to 100 mm, and this connects the top portion (10) and the side portion (11) which are both planar. This embodiment is characterized in that the design of the color pattern and the concave and convex pattern synchronizing with each other is provided even on the curved portion (12) of the corner having such a small radius of curvature (R), Specifically, needless-to-say not only on the surface of the top portion (10) and the side portion (11) which are both mainly planar but also even on the curved portion (12), the design of the color pattern and the concave and convex pattern synchronizing with each other of the convex projections (2) is formed, in which the convex projections (2) provided on one side (30) of the resin sheet (3) are not lost. In case where the radius of curvature (R) of the curved portion (12) is less than 1 mm, then it would be difficult to prevent the convex projections (2) from disappearing in insert molding, and a design of the color pattern and the concave and convex pattern synchronizing with each other could not be formed on the curved portion. More preferably, the radius of curvature (R) of the curved portion (12) is at least 2 mm. The radius of curvature (R) means the radius of curvature on the surface of the product of the decorative resin molded article (1).

Figure 3A:
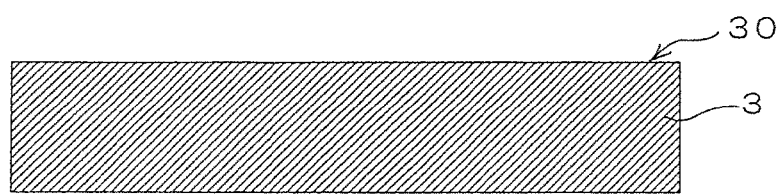
FIGS. 3A to 3C are schematic cross-sectional views of a decorated resin sheet in production steps of an embodiment.
Figure 3B:
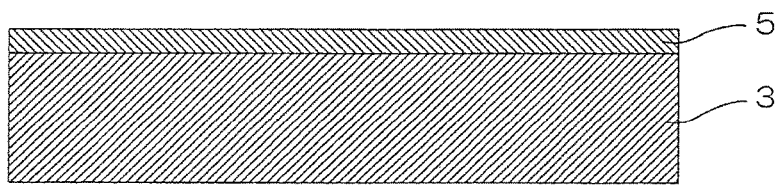

In producing the decorative resin molded article (1) of this embodiment, first, a coating material is applied onto one side (30) of the resin sheet (3) as shown in FIG. 3A, thereby forming the base layer (5) on that one side as shown in FIG. 3B. The coating method with the coating material is not specifically defined, for which is employable any known method of spraying, etc. The coating thickness may be suitably defined depending on the solid concentration of the coating material and on the planned thickness of the base layer (5). After thus coated, preferably, the resin sheet (3) is air-dried, for example, for 5 to 60 minutes, and then heated and cured at 50 to 100° C. for 20 minutes to 6 hours. The thickness of the base layer to be formed in one coating operation is at most 200 μm or so. Accordingly, for forming a thick base layer, coating is repeated, or that is, the process from coating to air-drying is repeated multiple times and, finally, the coated sheet is heated and cured to thereby form a base layer having a desired thickness.

Figure 3C:
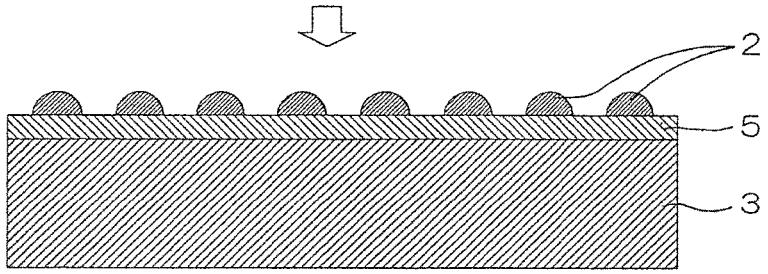

Next, using the ink containing a UV-curable resin and a colorant, convex projections (2) are formed on the surface of the base layer (5), as shown in FIG. 3C. For forming the convex projections (2), employable is a method of relief printing, planographic printing, intaglio printing, stencil printing or the like; however, preferred is ink jet printing not requiring a printing plate and capable of enabling precise design expression and forming a three-dimensional pattern. Not specifically defined, the ink jet printing mode to be employed here may be any of a continuous mode such as a charge modulation mode, a microdot mode, a charge spray control mode, an ink mist mode or the like, or an on-demand mode such as a Stemme mode, a pulse jet mode, a bubble jet mode (registered trademark), a electrostatic attraction mode or the like.

Figure 4A:
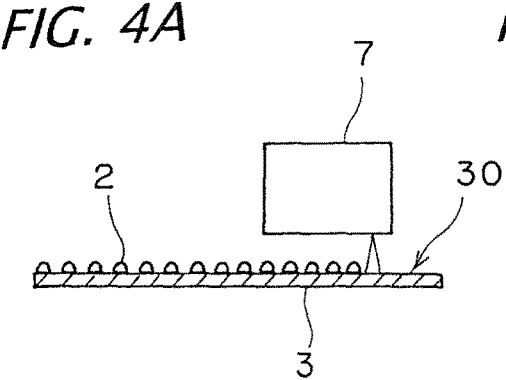
FIGS. 4A to 4D are flowchart schematically showing production steps for the decorative resin molded article.

As shown in FIG. 4A, the convex projections (2) may be formed by jetting droplets of the ink onto one side (30) of the resin sheet (3), in this embodiment, onto the surface of the base layer (5), using an Inkjet printer (7), and then immediately exposing them to UV rays to be cured. The operation of jetting the droplets and curing them may be repeated multiple times to form the convex projections. For the Ink application, the position on which the convex projections (2) are desired to be formed can be set in any desired manner, using an imaging software unit, and for example, based on the digital data, the ink application condition such as the droplet weight and the ink amount, as well as the UV curing condition and the ink application site can be controlled in any desired manner.

The concave and convex pattern of the convex projections (2) may be formed by controlling the deposition amount of the ink containing a UV-curable resin and a colorant. For controlling the ink deposition amount to fall within a range within which the concave and convex pattern could be formed, preferably, the ink has a viscosity of at least 9 mPa·s in jetting, and also preferably, the ink Is cured through UV irradiation simultaneously with the ink deposition. The color pattern formed of the convex projections (2) is owing to the colorant added to the ink as mentioned above, and the pattern can be given any desired color by controlling the colorant concentration and the ink deposition amount.

The surface tension at 25° C. of the ink containing a UV-curable resin and a colorant is preferably from 20 to 40 dyne/cm in consideration of the fact that the ink is applicable to various types of base layers, more preferably from 22 to 35 dyne/cm. For the reason of controlling the wettability of the ink to thereby prevent the formed image from bleeding and to thereby facilitate the ink supply to a print head, the surface tension is preferably at least 20 dyne/cm. On the other hand, however, when the wettability thereof lowers, the ink may be repelled to form a streaky image, and for preventing the problem, the surface tension is preferably at most 40 dyne/cm. In this description, the surface tension is a value measured with an automatic surface tensiometer (Kyowa Kaimen Kagaku's trade name "CBVP-A3"), according to a plate method.

For immediately curing the UV-curable resin in ink jet printing, a UV lamp serving as a UV irradiation unit is mounted in the ink jet printer (7), though not shown. Not specifically defined, the UV irradiation dose is preferably from 150 to 550 mJ/cm$^2$.

As in the above, after the resin sheet (3) thus having a design of a color pattern and a concave and convex pattern synchronizing with each other of the convex projections (2) provided therein has been formed, a resin injection-molded body (4) is laminated and integrated on the sheet according to a sheet-insert molding process, in case where the molded body has a complicated shape, preferably, the design-formed resin sheet (3) is pre-molded prior to the sheet-insert molding operation. The pre-molding is for previously molding the resin sheet into a shape similar to the shape of the final product, prior to the sheet-insert molding operation. The pre-molding reduces the load given to the UV-curable resin in the convex projections (2) in the sheet-insert molding operation, thereby preventing the convex projections (2) to form the concave and convex pattern from being broken.

As the pre-molding method, preferred is a vacuum forming method that is inexpensive and can attain the intended molding within a short period of time. The vacuum forming method is a method where a resin sheet is softened under heat, then pressed against a mold having a concave and convex configuration, and the air between the mold and the resin sheet is removed by suction to form a nearly vacuum condition, thereby airtigbtly attaching the resin sheet to the mold and imparting the desired shape to the resin sheet.

Figure 4B:
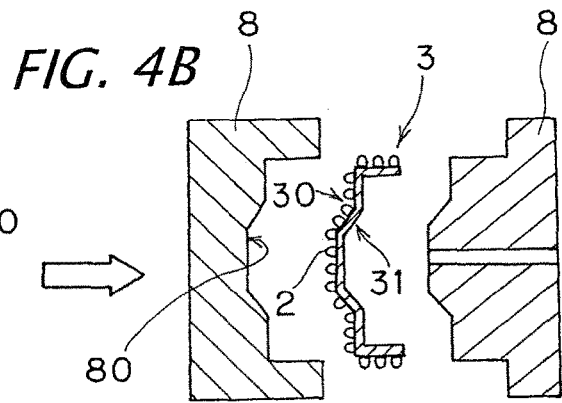
Figure 4C:
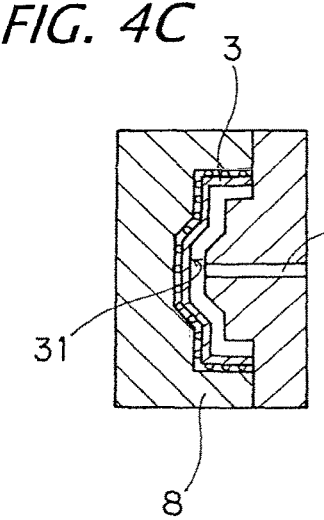
Figure 4D:
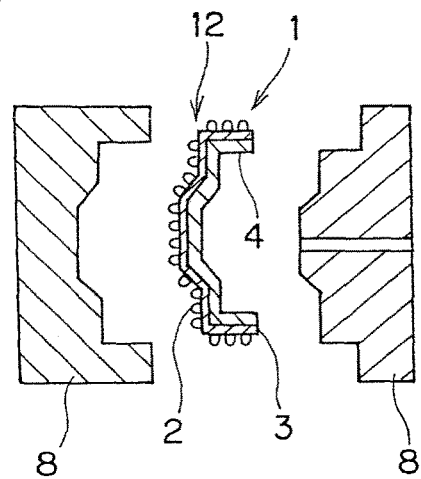

The pre-molded resin sheet (3) is set in an injection mold (8), as shown in FIGS. 4B and 4C As shown in the drawings, the resin sheet (3) is arranged in the injection mold (8) in such a manner that the above-mentioned one side (30) thereof on which the design-constituting convex projections (2) have been provided could face the cavity surface (80) of the injection mold (8) and the other side (31) thereof could face the side of the resin to be injected. With that, via the gate (81), a molten synthetic resin is injected into the cavity, whereby the synthetic resin is injected onto the other side (31) and the resin injection-molded body (4) is laminated and integrated on the other side (31). After the injection, this is cooled, and after the synthetic resin has hardened, the mold is opened as shown in FIG. 4D to take out the molded article. As described above, since, the design of a color pattern and the concave and convex pattern synchronizing with each other is formed even on the curved portion (12), preferably, the temperature and the pressure in injection molding are controlled. Not specifically defined, the temperature of the synthetic resin to be injected is preferably from 200 to 300° C., and the injection pressure of the synthetic resin is preferably from 100 to 200 MPa.

In this embodiment, as described above, the top layer (6) is formed on the surface of the article, and the top layer (8) may be formed, for example, by coating in the mold. The in-mold coating technique is roughly divided into two categories of a method that includes previously coating the inner surface of the mold with a coating material and the resin is molded inside the mold (referred as a pre-mold coating method); and a method that includes molding a resin in a mold and injecting a coating material into the mold to thereby coat the surface of the molded article therein (referred as an in-mold coating method). The latter can be further divided into two, a method where a coating material is injected into the mold where a resin has been molded, under high pressure (high-pressure method), and a method where the mold is opened slightly after resin molding therein and then a coating material is injected thereinto under low pressure, and thereafter the mold is again closed and the surface of the molded article is coated therein (low-pressure method). According to the in-mold coating technique, the surface of the coating layer is formed by the cavity surface of the mold, and therefore, the coating layer formed could have a mirror surface that reflects the cavity surface. In an embodiment, the in-mold coating technique may be combined with the sheet-inert molding technique. Above all, the low-pressure in-mold coating method is preferred here as preventing the concave and convex pattern from being lost under pressure. As one mode of the low-pressure in-mold coating method, an imprest molding method that has been put Into practical use recently is specifically noted as applicable to thermoplastic resin.

The method for forming the top layer (6) is not limited to the in-mold coating technique, but, for example, the layer may be formed according to a spray coating method. In coating in a mold, especially in the in-mold coating method, in case where the coating of the curved portion (12) is limited, the top layer (6) may be formed according to a spray coating method; and in such a case, the top layer (6) may be formed to have a flat surface by overspraying thereon. In this case, the coating thickness may be suitably determined depending on the solid concentration in the coating material and the planned thickness of the top layer (6). The drying condition is the same as that for the base layer.

According to the above-mentioned embodiment, the resin sheet (3) having a design of a color pattern and a concave and convex pattern synchronizing with each other, as formed by the convex projections (2) of a UV-curable resin, is used, and the resin injection-molded body (4) is laminated and integrated on the other side (31) of the sheet opposite to the design formed thereon, according to a sheet-insert molding method. Consequently, the convex projections (2) are prevented from being deformed in injection molding, and even the curved portion (12) of the decorative resin molded article (1) can be given the design of the color pattern and the concave and convex pattern synchronizing with each other. In addition, since the design exists on the surface side of the resin sheet (3), the design can be expressed outward not via the resin sheet (3). Accordingly, the design is not influenced by the transmittance and the like of the resin sheet (3) and the article can have an appearance having an excellent concave and convex impression. Further, as the transparent top layer (6) is provided on the convex projections (2), the concave and convex pattern can be visually sensed via the top layer (6) and the design value can be thereby enhanced.

Figure 5:
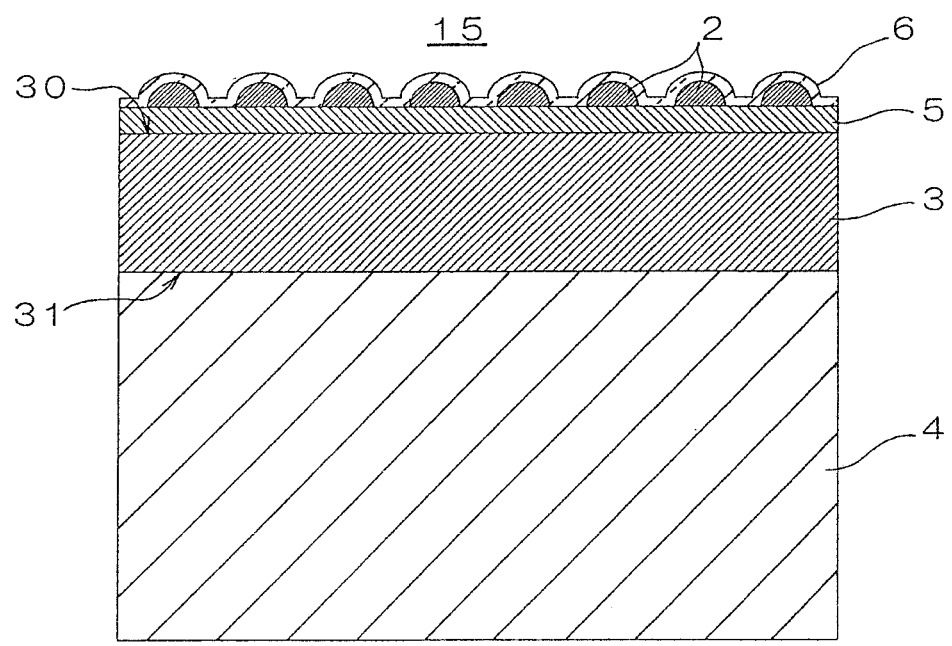
FIG. 5 is a cross-sectional view of a decorative resin molded article of another embodiment.

FIG. 5 shows another embodiment of a decorative resin molded article (15). In this embodiment, the top layer (6) is so formed that the surface thereof could have a concave and convex configuration that follows the concave and convex pattern formed by the convex projections (2). Providing the top layer (8) that follows the concave and convex pattern makes it possible to modify the texture of the article and to impart an outward appearance having a different material sense to the article. The top layer (6) of the type that follows the concave and convex pattern can be formed, for example, by spraying the surface of the injection-molded article with a coating material.

In the above-mentioned embodiments, the fop layer (6) is formed during or after sheet-insert molding. However, in an embodiment, the top layer (8) may be previously formed prior to the sheet-insert molding. In other words, an embodiment of sheet-insert molding that uses the resin sheet (3) having been processed to have all the coating layers including the top layer (6) also falls within the scope of the invention. In such a case, the top layer (6) may be formed to have a flat surface or to have a concave and convex surface. In that manner where the top layer (6) is previously formed, the top layer (6) is kept in contact with the cavity surface of the mold in insert molding therein, or that is, the convex projections (2) are not in direct contact with the cavity surface, and therefore the convex projections (2) can be more surely prevented from being deformed during molding.

The applications of the decorative resin molded article are not specifically defined. For example, the molded article can be used as housings of various electric appliances such as home electric appliances, communication appliances and others, and also as interior members in vehicles such as automobiles, etc.

EXAMPLES

The embodiment is described in more detail with reference to the following Examples; however, the embodiment is not limited to the following Examples.

Example 1

1. Preparation of Coating Material for Forming Base Layer
Preparation of Pigment Concentrate for Coating Material for Forming Base Layer
1) trade name "BPZ 6340" (Toyo Aluminium's aluminium paste): 20 parts by weight
2) trade name "Acrydic WXU-880" (DIC's acrylic resin): 50 parts by weight
3) trade name "Acrydic WXU-616" (DIC's acrylic resin): 70 parts by weight
4) methyl isobutyl ketone: 12.5 parts by weight
5) xylene: 12.5 parts by weight
The above-mentioned materials were mixed in a mixer, and dispersed in a bead mill for 3 hours to prepare a pigment concentrate for a coating material for base layer formation.
Preparation of Coating Material for Forming Base Layer
1) the pigment concentrate prepared above: 100 parts by weight
2) methyl isobutyl ketone: 25 parts by weight
3) xylene: 25 parts by weight
4) butyl acetate: 25 parts by weight
5) toluene: 25 parts by weight
6) trade name "Burnock DN-980" (DIC's crosslinking agent, polyisocyanate prepolymer): 10 parts by weight
Of the above-mentioned materials, 1) to 5) were mixed in a mixer until the whole could be uniform, then the material 6) was added thereto and further mixed, and thereafter filtered to remove the impurities, thereby preparing a coating material for base layer formation.
2. Formation of Base Layer
As a resin sheet, prepared was a polycarbonate film having a size of 17 cm length×30 cm width and having a thickness of 0.5 mm (Teijin Chemical's trade name "Panlite Sheet PC-1151"), and the surface thereof was washed, with isopropanol, and dried with air. Next, the coating material for base, layer formation prepared above was applied onto the film, using a spray gun (Anest Iwata's trade name "W-101"), in such a manner that the dry film thickness could be 15 μm (the dry film weight could be 0.002 $g/cm^2$), then dried with air for 10 minutes, and further dried with hot air at 70° C. for 30 minutes, thereby forming a base layer.
3. Preparation of Ink
Preparation of Pigment Concentrate for Ink
1) trade name "Hostaperm Blue P-BFS" (BASF's copper phthalocyanine pigment): 15 parts by weight
2) trade name "SOLSPERSE 32000" (Lubrizol Japan's dispersant): 7.5 parts by weight
3) trade name "SR9003" (Sartomer Japan's reactive monomer, propoxylated (2) neopentyl glycol diacrylate, Tg: 32° C., viscosity at 25° C.: 15 mPa·s): 77.5 parts by weight
The above-mentioned materials were mixed in a mixer to prepare a pigment concentrate for ink.

Preparation of Ink
1) the pigment concentrate for ink prepared above: 13.3 parts by weight
2) trade name "CN981" (Sartomer Japan's reactive oligomer, aliphatic urethane acrylate, Tg: 22° C.): 22.6 parts by weight
3) trade name "VEEA" (Nippon Shokubai's reactive monomer, 2-(2-hydroxyethoxy)ethyl acrylate, viscosity at 25° C.: 8 mPa·s): 58 parts by weight
4) trade name "Irgacure 184" (BASF's photopolymerization initiator, 1-hydroxycyclohexyl phenyl ketone): 5.0 parts by weight
5) trade name "Irgacure 819" (BASF's photopolymerization initiator, bis(2,4,6-trimethylbenzoyl)phenyl phosphine oxide): 3.0 parts by weight
6) trade name "IRAGASTAB UV10" (BASF's thermal radical polymerization inhibitor, trimethylolpropane triacrylate): 0.1 parts by weight The above-mentioned materials were mixed in a mixer, dispersed in a bead mill for 3 hours, and then filtered to remove the impurities, thereby preparing an ink. The viscosity in jetting (50° C.) of the obtained ink was 11 mPa·s, and the surface tension at 25° C. thereof was 25 dyne/cm.

4. Formation of Convex Projections

Using a serial ink jet printer, the ink prepared above was jetted onto the surface of the base layer-formed polycarbonate film, which was then immediately exposed to UV rays from a UV lamp to cure the ink. This operation was repeated to form decorative convex projections. The condition was as follows:

Evaluation Pattern
Design: 2-mm checkered pattern
Plane-view width of convex projection: 2 mm
Height of convex projection: 90 μm
Areal ratio of convex projections: 50%
Printing Condition
Head heating temperature: 57° C.
Nozzle diameter: 70 μm
Applied voltage: 50 V
Pulse width: 15 μs
Drive frequency: 4.5 kHz
Horizontal resolution: 360 dpi
Vertical resolution: 720 dpi
Repeated printing frequency: 4 times
Weight of one ink droplet: 110 pg
Total imparted ink: 100 g/m$^3$
UV Irradiation Condition
Type of lamp: metal halide lamp
Lamp output: 120 W/cm
Irradiation time: 1 sec
Irradiation frequency: 20 times
Irradiation distance: 5 mm
The accumulated quantity of light was 225 mJ/cm$^2$.

5. Die-Cutting

For setting the design-formed polycarbonate film in an injection mold, the film was die-cut so as to separate the necessary part from the unnecessary part thereof. Briefly, with a Thomson blade frame kept attached to the design-formed side of the polycarbonate film, the film was die-cut with a press machine (Iino's trade name "IOC-20").

6. Insert Molding

Using an injection molding machine (Ube Kosan Machinery's trade name "MD450S-IV"), the die-cut polycarbonate film was integrated with a resin injection-molded body according to an insert molding method. Briefly, the die-cut polycarbonate film was set in the injection molding machine in such a manner that the design-formed side thereof could face, the cavity surface, and a synthetic resin was injected into the cavity under the condition mentioned below, then cooled and hardened, and thereafter the molded article was taken out. The injection mold used here is one that can produce a decorative resin molded article having a curved portion with a radius of curvature of 2 mm, 3 mm or 5 mm.

Molding Condition
Synthetic resin: PC/ABS resin (Nippon A & L's trade name "PAX-1420")
Screw inner temperature: 260° C.
Core temperature: 40° C.
Cavity temperature: 40° C.
Pressure in injection: 125 MPa Thus obtained, the molded article had a design having an excellent concave and convex impression of a color pattern, and a concave and convex pattern synchronizing with each other, and even in the curved portion of the article, the convex projections did not deform, and the curved portion had the same excellent outward appearance as the planar portion of the article.

Example 2

1. Preparation of Coating Material for Forming Top Layer
1) trade name "Plaglass #8000 TC-307" (Dai Nippon Toryo's acryl/urethane resin coating material): 100 parts by weight
2) trade name "TXIB" (Eastman Chemical Japan's diluent for curing agent, 2,2,4-trimethyl-1,3-pentanediol diisobutyrate): 1 part by weight
3) trade name "Parkadox 16" (Kayaku Akzo's curing agent, di-(4-tert-butylcyclohexyl)peroxy dicarbonate, 4-(1,1-dimethylethyl)cyclohexanol): 1 part by weight Of the above-mentioned materials, 2) and 3) were stirred and defoamed in a rotation/revolution mixer in vacuum, then the material 1) was added thereto and further stirred and defoamed to prepare a coating material for top layer formation.

2. Formation of Top Layer

In the same manner as in Example 1, a base layer and convex projections were formed on a polycarbonate film, which was then die-cut, and integrated with a resin injection-molded body according to an insert molding method; and then the coating material for top layer formation prepared above was injected into the mold to form a top layer having a thickness (thickness from the top of the convex projection to the surface of the top layer) of 600 μm according to an in-mold coating (imprest molding) method. The molded article was taken out. The coating condition was as follows:

Coating Condition
Mold split clearance: 600 μm
Retention time: 150 seconds
Core temperature: 30° C.
Cavity temperature: 75° C.

Thus obtained, the molded article had a design having an excellent concave and convex impression of a color pattern and a concave and convex pattern synchronizing with each other, and even in the curved portion of the article, the convex projections did not deform, and the curved portion had the same excellent outward appearance as the planar portion of the article. In addition, since the article had the top layer, its surface is flat and its design had a sense of depth.

Example 3

1. Preparation of Coating Material for Forming Top Layer
Preparation of Liquid A
1) trade name "Sorless Clear NDP-300 UT" (Hamani Paint's polyester resin coating material): 50 parts by weight
2) trade name "Sorless Diluent No. 1000" (Hamani Paint's diluent for polyester resin): 5 parts by weight
3) trade name "Parmeck N" (NOF's curing agent for polyester resin): 2.8 parts by weight The above-mentioned materials were mixed with a spatula to prepare 57.8 parts by weight of a liquid A.
Preparation of Liquid B
1) trade name "Sorless Clear NDP-300 UT" (Hamani Paint's polyester resin coating material): 50 parts by weight
2) trade name "Sorless Diluent No. 1000" (Hamani Paint's diluent for polyester resin): 5 parts by weight
3) cobalt octylate: 1 part by weight The above-mentioned materials were mixed with a spatula to prepare 56 parts by weight of a liquid B.

The above-prepared liquid A and liquid B were mixed with a spatula to prepare a coating material for top layer formation.

2. Formation of Top Layer

The coating material for top layer formation prepared above was applied to the molded article produced in Example 1, using a spray gun (Anest Iwata's trade name "W-200"), then dried with air for 20 minutes; and the operation was repeated three times so that the coated, surface could be flat and the final dry film thickness (thickness from the top of the convex projection to the surface of the top layer) could be 600 μm (the dry film weight could be 0.16 g/cm$^2$). Further, this was dried with hot air at 60° C. for 120 minutes, thereby forming a top layer.

Thus obtained, the molded article had a flat surface and its design had a sense of depth.

Example 4

The coating material for top layer formation prepared in Example 3 was applied to the molded article produced in Example 1, using a spray gun (Anest Iwata's trade name "W-200"), in such a manner that the coated surface could have a concave and convex configuration and the dry film thickness could be 30 μm (the dry film weight could be 0.008 g/cm$^2$), then dried with air for 20 minutes, and further dried with hot air at 60° C. for 120 minutes, thereby forming a top layer.

Thus obtained, the molded article had a concave and convex surface, and, as compared with that in Example 1, the article was glossy and was given a varying texture and additionally given an outward appearance having a different material sense.

Example 5

1. Preparation of Coating Material for Forming Top Layer
1) trade name "UV Hard Clear VCH6051 TXF" (Hamani Paint's UV-curable acrylic coating material): 100 parts by weight
2) trade name "TX Thinner No. 13" (Hamani Paint's urethane thinner): 20 parts by weight The above-mentioned materials were mixed with a spatula to prepare a coating material for top layer formation.

2. Formation of Top Layer

The coating material for top layer formation prepared above was applied onto the surface of the a polycarbonate film on which a base layer and convex projections had been formed in the same manner as in Example 1, using a spray gun (Anest Iwata's trade name "W-101"), in such a manner that the coated surface could be flat and the dry film thickness (thickness from the top of the convex projection to the surface of the top layer) could be 150 μm (the dry film weight could be 0.04 g/cm$^2$), then dried with air for 20 minutes, and further dried with hot air at 50° C. for 20 minutes. Next, this was exposed to UV rays at an accumulated quantity of light of 1.77 mJ/cm$^2$, thereby curing the coating material to form a top layer. Subsequently, in the same manner as in Example 1, this was die-cut and then insert-molded in such a manner that the top layer thereof could face the cavity surface.

Thus obtained, the molded article had a design having an excellent concave and convex impression of a color pattern and a concave and convex pattern synchronizing with each other, and even in the curved portion of the article, the convex projections did not deform, and the curved portion had the same excellent outward appearance as the planar portion of the article. In addition, since, the article was previously given the top layer, it had a clear concave and convex impression as compared with that in Example 2.

Comparative Example 1

A molded article was produced in the same manner as in Example 1, except that polycarbonate film was so set in the injection mold that the design-formed side thereof could be kept facing the core face.

The molded article obtained herein had a poor outward appearance, as not so much having a concave and convex impression as a whole.

What is claimed is:

1. A method for producing a decorative resin molded article, comprising:

forming, by ink jet printing, one or more convex projections on one side of a resin sheet so that said one or more convex projections in combination with said one side form a surface pattern that has convex and concave portions, said one or more convex projections being made of an ink containing a UV-curable resin and a colorant, said surface pattern exhibiting a color pattern comprised of (a) the colorant contained in the ink of said one or more projections and a different color exhibited on said one side of the resin sheet at portions thereof other than said one or more projections and/or (b) the colorant in the ink of a first one or more of the projections of a first color and the colorant in the ink of at least a second, different one or more of the projections of a second color, whereby a color difference is exhibited within the color pattern;

then arranging the resin sheet inside an injection mold, injecting a synthetic resin onto an other side of the resin sheet in the injection mold, thereby laminating a resin injection-molded body on said other side of the resin sheet, wherein the resin injection-molded body and the resin sheet, after said resin injection-molded body is laminated to said resin sheet, together form a body having a curved surface shape portion and a planar portion, and wherein said one or more convex projections comprise a plurality of convex projections including a first subset of convex projections that occur along the curved shape portion and a second subset of convex projections that occur along the planar portion, and after the resin injection-molded body is laminated on the resin sheet in the injection mold, slightly opening the injection mold to provide a predetermined mold split clearance and injecting a coating material comprising a transparent resin into the injection mold while maintaining said predetermined mold split clearance; and after said injecting the coating material, closing the injection mold with said coating material between the resin sheet and a cavity surface of the injection mold, the cavity surface having a mirror finish, thereby forming a transparent top layer comprising the transparent resin to cover said one or more convex projections at said one side of the resin sheet, wherein the surface of the top layer is formed by the cavity surface as a flat face having a mirror finish and which follows said one side of the resin sheet, and wherein thickness of the top layer is from 100 to 1000 microns as measured from an external-most height of said one or more projections to the surface of said top layer.

2. The method for producing a decorative resin molded article as claimed in claim 1, further comprising:

forming a base layer colored differently from the one or more convex projections on said one side of the resin sheet, and wherein said forming said one or more convex projections comprises forming the one or more convex projections on the base layer at said one side of the resin sheet to thereby form said surface pattern.

3. The method for producing a decorative resin molded article as claimed in claim 1, wherein a height of said one or more projections is 60 to 120 microns.

4. The method for producing a decorative resin molded article as claimed in claim 1, wherein the decorative resin molded article comprises a top portion, a side portion, and a curved surface shape portion;

wherein the curved surface shape portion forms a corner arranged between the top portion and the side portion and has a radius of curvature in cross section that is 1 to 100 mm;

wherein the one or more convex projections comprises a plurality of convex projections;

wherein the plurality of convex projections protrude outwardly; and wherein the plurality of convex projections occur at least along said top portion, said curved surface shape portion, and said side portion.

5. The method for producing a decorative resin molded article as claimed in claim 1, wherein said forming said one or more convex projections comprises forming said one or more convex projections with said ink that contains said UV-curable resin, wherein said UV-curable resin comprises:

a reactive monomer having an acrylic functional group in a molecule of the reactive monomer;

a reactive oligomer which has an acrylic functional group in a molecule of the reactive oligomer having a glass transition point that is from $-10°$ to $40°$ C.; and a photopolymerization initiator.

6. The method for producing a decorative resin molded article as claimed in claim 5, wherein said ink contains from 55 to 90% by weight of the reactive monomer, from 5 to 40% by weight of the reactive oligomer, and from 1 to 10% by weight of the photopolymerization initiator, and wherein the reactive monomer comprises a 2-functional acrylate, and the reactive oligomer comprises an aliphatic urethane acrylate.

* * * * *